US009404188B2

(12) United States Patent
Smith et al.

(10) Patent No.: US 9,404,188 B2
(45) **Date of Patent: *Aug. 2, 2016**

(54) CORROSION INHIBITING COMPOSITION

(75) Inventors: Tyler N. Smith, Missoula, MT (US); Donald E. Kiely, Missoula, MT (US); Kylie Kramer-Presta, Missoula, MT (US)

(73) Assignee: Rivertop Renewables, Missoula, MT (US)

( * ) Notice: Subject to any disclaimer, the term of this patent is extended or adjusted under 35 U.S.C. 154(b) by 785 days.

This patent is subject to a terminal disclaimer.

(21) Appl. No.: 13/294,085

(22) Filed: Nov. 10, 2011

(65) Prior Publication Data

US 2012/0119152 A1 May 17, 2012

Related U.S. Application Data

(60) Provisional application No. 61/412,706, filed on Nov. 11, 2010.

(51) Int. Cl.
*C23F 11/08* (2006.01)
*C02F 5/10* (2006.01)
*C23F 11/12* (2006.01)

(52) U.S. Cl.
CPC ................ *C23F 11/08* (2013.01); *C02F 5/105* (2013.01); *C23F 11/126* (2013.01); *C02F 2303/08* (2013.01)

(58) Field of Classification Search
CPC ...... C02F 5/105; C02F 2303/08; C23F 11/08; C23F 11/126
USPC ........ 252/389.4, 396, 389.62, 389.52, 389.54
See application file for complete search history.

(56) References Cited

U.S. PATENT DOCUMENTS

| | | | |
|---|---|---|---|
| 1,520,885 | A | 12/1924 | Rankin |
| 2,314,831 | A | 3/1943 | Kamlet |
| 2,380,196 | A | 7/1945 | Solomon |
| 2,419,019 | A | 4/1947 | Hales |
| 2,436,659 | A | 2/1948 | Mehltretter et al. |
| 2,472,168 | A | 6/1949 | Mehltretter |
| 2,529,177 | A | 11/1950 | Nieland |
| 2,529,178 | A | 11/1950 | Nieland |
| 3,242,207 | A | 3/1966 | Ulrich et al. |
| 3,346,623 | A | 10/1967 | Young |
| 3,362,885 | A | 1/1968 | Harned |
| 3,589,859 | A | 6/1971 | Foroulis |
| 3,652,396 | A | 3/1972 | Tanaka |
| 3,696,044 | A | 10/1972 | Rutledge |
| 3,711,246 | A | 1/1973 | Foroulis |
| 3,798,168 | A | 3/1974 | Tumerman et al. |
| 3,819,659 | A | 6/1974 | Baldwin et al. |
| 3,951,877 | A | 4/1976 | Okumura et al. |
| 4,000,083 | A | 12/1976 | Heesen |
| 4,102,799 | A | 7/1978 | Finck |
| 4,108,790 | A | 8/1978 | Foroulis |
| 4,120,655 | A | 10/1978 | Crambes et al. |
| 4,129,423 | A | 12/1978 | Rubin |
| 4,485,100 | A | 11/1984 | Hochstrasser et al. |
| 4,512,552 | A | 4/1985 | Katayama et al. |
| 4,833,230 | A | 5/1989 | Kiely et al. |
| 4,834,793 | A | 5/1989 | Schneider et al. |
| 4,845,123 | A | 7/1989 | Walaszek |
| 5,017,485 | A | 5/1991 | Bringer-Meyer |
| 5,256,294 | A | 10/1993 | van Reis |
| 5,264,123 | A | 11/1993 | Bailey |
| 5,279,756 | A | 1/1994 | Savio et al. |
| 5,312,967 | A | 5/1994 | Kiely et al. |
| 5,329,044 | A | 7/1994 | Kiely et al. |
| 5,330,683 | A | 7/1994 | Sufrin |
| 5,364,644 | A | 11/1994 | Walaszek |
| 5,376,499 | A | 12/1994 | Hammerschmidt et al. |
| 5,434,233 | A | 7/1995 | Kiely et al. |
| 5,473,035 | A | 12/1995 | Kiely et al. |
| 5,478,374 | A | 12/1995 | Kiely |
| 5,531,931 | A | 7/1996 | Koefod |
| 5,561,160 | A | 10/1996 | Walaszek |
| 5,562,828 | A | 10/1996 | Olsen et al. |
| 5,599,977 | A | 2/1997 | Kiely et al. |
| 5,891,225 | A | 4/1999 | Mishra |
| 5,958,867 | A | 9/1999 | Lamberti et al. |
| 5,999,977 | A | 12/1999 | Riddle |
| 6,049,004 | A | 4/2000 | Kiely et al. |

(Continued)

FOREIGN PATENT DOCUMENTS

| | | |
|---|---|---|
| CA | 2188063 | 4/1998 |
| CN | 1131651 | 9/1996 |

(Continued)

OTHER PUBLICATIONS

Abbadi et al., New Ca-Sequestering Materials Based on the Oxidation of the Hydrolysis Products of Lactose, Green Chem, 1999, 231-235.

Abd El Kader, J.M. et al., ""Corrosion inhibition of mild steel by sodium tungstate in neutral solution. Part 3. Coinhibitors and synergism,"" British Corrosion Journal, 33, 152-157 (1998) Chern Abstr AN 1998:796697.

Abdallah, M. "Sodium gluconate, triethanolamine and their mixtures as corrosion inhibitors of carbon steel in 3.5% NaC1 solution," Journal of the Electrochemical Society of India, 48, 121-127, (1999) Chern Abst AN 1999:374923.

(Continued)

*Primary Examiner* — Liam J Heincer
*Assistant Examiner* — Nicholas Hill
(74) *Attorney, Agent, or Firm* — Lisa V. Mueller; Michael Best & Friedrich LLP

(57) ABSTRACT

This invention relates to novel corrosion inhibitors which are capable of sequestering metal ions such as calcium and magnesium and are derived in part from renewable carbohydrate feedstocks. The corrosion inhibitors are mixtures containing one or more hydroxycarboxylic acid salts and one or more suitable oxoacid anion salts.

9 Claims, No Drawings

(56) References Cited

U.S. PATENT DOCUMENTS 6,156,226 A 12/2000 Klyosov et al.
6,228,825 B1 5/2001 Gorlin et al.
6,372,410 B1 * 4/2002 Ikemoto et al. ............... 430/318
6,498,269 B1 12/2002 Merbouh et al.
6,686,325 B2 * 2/2004 Hoyt et al. .................... 510/255
6,831,195 B2 12/2004 Nishimura et al.
6,843,931 B2 1/2005 Sapienza
6,861,009 B1 3/2005 Leist
6,894,135 B2 5/2005 Kiely et al.
6,919,478 B2 7/2005 Kawato et al.
7,125,441 B1 10/2006 Furman et al.
7,314,906 B2 1/2008 Kiely et al.
7,658,861 B2 2/2010 Koefod
7,692,041 B2 4/2010 Kiely
8,153,573 B2 4/2012 Miralles et al.
8,303,721 B2 11/2012 Warkotsch et al.
8,679,364 B2 3/2014 Pylkkanen
2002/0068836 A1 6/2002 Haupfear et al.
2003/0109394 A1 6/2003 Ruhr et al.
2003/0168625 A1 9/2003 Sapienza et al.
2003/0176305 A1 9/2003 Hoyt et al.
2004/0025908 A1 2/2004 Douglas et al.
2004/0028655 A1 2/2004 Nelson et al.
2004/0185562 A1 9/2004 Schroeder et al.
2005/0202981 A1 9/2005 Eveland et al.
2005/0202989 A1 9/2005 Wilson
2005/0230658 A1 10/2005 Koefod
2005/0071431 A1 11/2005 Roddy
2007/0037727 A1 2/2007 Fiore et al.
2007/0278446 A1 12/2007 Koefod
2008/0033205 A1 2/2008 Kiely et al.
2008/0099716 A1 5/2008 Koefod
2008/0287334 A1 * 11/2008 Smith et al. ................... 510/220
2008/0302737 A1 12/2008 Denkewicz, Jr. et al.
2009/0131259 A1 5/2009 Kiely
2009/0250653 A1 10/2009 Kiely et al.
2010/0041574 A1 2/2010 Warkotsch et al.
2010/0130774 A1 5/2010 Wan et al.
2010/0191002 A1 7/2010 Kiely
2010/0242997 A1 9/2010 Smith et al.
2010/0256036 A1 10/2010 Benda et al.
2011/0226288 A1 9/2011 Warkotsch et al.
2011/0232692 A1 9/2011 Zipfel et al.
2011/0263905 A1 10/2011 Purola
2011/0269662 A1 11/2011 Miralles
2011/0312871 A1 12/2011 Miralles et al.
2012/0035356 A1 2/2012 Kiely
2012/0238005 A1 9/2012 Wieland
2012/0277141 A1 11/2012 Smith
2012/0295986 A1 11/2012 Smith
2012/0305832 A1 12/2012 Kiely
2013/0090281 A1 4/2013 Feenstra et al.
2014/0275621 A1 9/2014 Donen
2014/0275622 A1 9/2014 Donen
2014/0275623 A1 9/2014 Donen

FOREIGN PATENT DOCUMENTS

CN 1970488 5/2007
DE 2016686 11/1970
DE 1929968 12/1970
DE 117492 1/1976
DE 3331751 3/1984
DE 3519884 1/1986
EP 0652305 A1 5/1995
EP 0758678 2/1997
EP 0819653 1/1998
EP 1201617 5/2002
FR 2054945 6/1971
FR 2115300 8/1972
GB 866840 A * 5/1961
GB 2405636 9/2003
JP 47048091 12/1972
JP S50-045744 4/1975
JP S51011030 1/1976
JP 51041578 11/1976
JP 54043840 4/1979
JP S57192270 11/1982
JP S58091174 5/1983
JP 60050188 A 3/1985
JP S60050188 3/1985
JP 60108352 6/1985
JP 60112676 6/1985
JP 63248782 10/1988
JP 04214057 8/1992
JP H06306652 11/1994
JP H09104687 4/1997
JP H09-227900 9/1997
JP 2004123465 4/2003
JP 2003306369 10/2003
JP 2008054806 3/2008
KR 20020066275 A 8/2002
PL 98149 8/1978
RO 69880 4/1981
WO 92/07108 4/1992
WO WO 00/34221 6/2000
WO WO 2004/052958 6/2004
WO WO 2004/052959 6/2004
WO WO 2008/021054 2/2008
WO WO 2009/065143 5/2009
WO 2010/086832 8/2010
WO 2011/032988 3/2011
WO 2011/100344 8/2011
WO 2011/138719 11/2011
WO WO 2012/065001 5/2012
WO WO 2012/145688 10/2012
WO WO 2012/145690 10/2012
WO WO 2013/090090 6/2013

OTHER PUBLICATIONS

Allcock, H.R. et al., “Effect of nonstoichiometric reactant ratios on linear condensation polymers,” Contemporary Polymer Chemistry, 2nd Edition, Prentice-Hall, New Jersey (1990) Part II, 274-275.

Billmeyer, F.W., Jr., “Molecular weight and molecular-weight distribution,” Textbook of Polymer Science, 3rd Edition, Wiley Interscience, New York (1984) 38-47.

Cantrell, C. E., et al., “"s-Dicarbonyl Sugars. 5. A Novel Synthesis of a Branched- Chain Cyclitol,"” J. Org. Chern. (1977) 42(22):3562-3567.

Carter, Andy, “Modifications in the Preparation of Glucaric Acid and Some 4-alkyl-4-azaheptane-1,7-diamines,” 1998, Thesis, University of Alabama, Birmingham, AL, p. 18-20.

Chen, L., “Experimental and Theoretical Studies Concerned with Synthetic Acyclic Carbohydrate Based Polyamides,” A Dissertation, University of Alabama at Birmingham (1992).

Chen, L. et al., “Synthesis of steroregular head-tail hydroxylated nylons derived from D-glucose,” J. Org. Chem. (1996) 61:5847-5851.

Collepardi, M.M.; “Concrete Admixture Handbook: Properties, Science and Technology”, 2nd Edition, Ramachandran,V.S. Editor,Noyes Publications, Park Ridge,NJ (1995) p. 286-409.

Cotton, F.A. et al., Advanced Inorganic Chemistry, 1988, p. 341-353, John Wiley and Sons, New York.

CRC Handbook of Chemistry and Physics, edited by Weast et al., 64th Edition, 1983-84, Boca Raton, Florida, p. B-117.

Hashimoto et al., “Macromolecular synthesis from caccharic lactones. Ring-opening polyaddition of D-glucaro- and D-mannaro-1,4:6,3-dilactones with alkylenediamines,” J. Polym. Sci. Part A: Polym. Chem. (1993) 31:3141-3149.

Hashimoto, K. et al., “Ring-opening polyaddition of D-glucaro-1,4:6,3-dilactone with p-zylylenediamine,” Macromol. Chem. Rapid Commun. (1990) 11:393-396.

Haworth et al., “Lactones of mannosaccharic acid, Part I. 2: 5-dimethyl Δ4-manno-saccharo-3: 6-lactone 1-methyl ester, an analogue of ascorbic acid,” J. Chem. Soc. London (1944) 56:217-224.

Haworth, W.N. et al., “Some Derivatives of Glucosaccharic Acids,” J. Chem. Soc. (1944) 25:65-76.

(56) References Cited

OTHER PUBLICATIONS

Kiely et al., "Hydroxylated nylons based on unprotected esterified D-glucaric acid by simple condensation reactions," J. Am. Chem. Soc. (1994) 116(2):571-578.
Kirk-Othmer Encyclopedia of Chemical Technology, 3rd Edition, Wiley, New York, vol. 16, 617-634, "Hydrocarbon Resins" to "Hypnotics, Sedatives, Anticonvulsants".
Korzh, E.N. et al., "Acidity and corrosion activity of brine refrigeratnts based on calcium chloride," Zhurnal Prikladnoi Khimii Journal (Russian) (1981) 54:2404-2407, Chern. Abstr. AN 1982-147045.
Lachman, A., "Dihydroxy-Tartaric Acid," Amer. Chern. Soc. (1921) 43:2091-2097.
Lewis, B.A. et al., Chapter 13, "Galactaric acid and its derivatives," Methods in Carbohydrate Chemistry, R.L. Whistler et al., editors, (1953) II:38-46.
Lin, "Diverse Applications of Carbohydrate Acids in Organic Synthesis," a Dissertation, University of Alabama at Birmingham (1987) p. 48-50, 72-74.
Lowe et al., Soaps and Detergents—The Inorganic Components, J. Am. Oil Chem. Soc., 1978, 55, 32-35.
Mainhardt, H., "N20 Emissions from Adipic Acid and Nitric Acid Production," IPCC Good Practice Guidance and Uncertainty Management in National Greenhouse Gas Inventories (2001).
Marukame, K., S.Fushoku Burnon linkai Shiryo(Nippon Xairyo Gakkai), journal written in Japanese, 173, 1-8, (1993) Chern. Abstr. AN 1993:543767.
Mehletretter, C.L., "D-Giucaric Acid," Methods in Carbohydrate Chemistry, 1963, p. 46-48, vol. II, Academic Press, New York.
Mehltretter, C.L. et al., "Saccharic and Oxalic Acids by the Nitric Acid Oxidation of Dextrose," Agric. and Food Chern. (1953) 1(12):779-783.
Merbough, N. et al., "4-AcNH-tempo-Catalyzed Oxidation of Aldoses to Aldaric Acids Using Chlorine or Bromine as Terminal Oxidants," J. Carbohydr. Chem., 2002, 21:.66-77.
Mor, E. et al., "Steel corrosion inhibition in seawater by calcium organic compounds," Annali deii'University di Ferrara, Sezione 5; Chimica Pura ed Applicata, Journal in French (1971),Chem Abstr AN 1971:414090.
Mor, E. et al., "Zinc gluconate as an inhibitor of the corrosion of mild steel in sea water," Lab Corros. Mar. Met, British Corrosion Journal (1976) 11:199-203 Chem. Abstr. AN 1977:129710.
Mustakas, G.C. et al., "Potassium Acid Saccharate by Nitric Acid Oxidation of Dextrose," Industrial and Engineering Chemistry, Mar. 1954, 427-434.
National Association of Corrosion Engineers (NACE) Standard TM0169-95 as Modified by the Pacific Northwest States, Test Method B, Revision (Apr. 2006).
Ogata, N. et al., "Active polycondensation of diethyl 2,3,4,5-tetrahydroxyadipate with diamines," J. Polym. Sci. Polym. Chem. Ed. (1976) 14:783-792.
Ogata, N. et al., "Copolycondensation of hydroxyl diesters and active diesters with hexamethylenediamine," J. Polym. Sci. Polym. Chem. Ed. (1977) 15:1523-1526.
Ogata, N. et al., "Polycondensation reaction of dimethyl tartrate with hexamethylenediamine in the presence of various matrices," J. Polym. Sci. Polym. Chem. Ed. (1980) 18:939-948.
Ogata, N. et al., "Synthesis of hydrophilic polyamide by active polycondensation," J. Polym. Sci. Polym. Lett. Ed. (1974) 12:355-358.
Ogata, N. et al., "Synthesis of hydrophilic polymide from L-tartarate and diamines by active polycondensation," J. Polym. Sci. Polym. Chem. Ed. (1975) 13:1793-1801.
Ogata, N. et al., "Synthesis of polyamides through active diesters," J. Polym. Sci., Polym. Chem. Ed. (1973) 11:1095-1105.
Ogata, N. et al., "Synthesis of polyesters from active diesters," J. Polym. Sci. Chem. Ed. (1973) 11:2537-2545.
Ogata, N., "New polycondensation systems," Polym. Prepr. (1976) 17:151-156.
Pamuk et al. "The preparation of D-glucaric acid by oxidation of molasses in packed beds" Journal of Chemical Technology and Biotechnology (2001) 76:186-190.
Roper, H., "Selection oxidation of D-glucose: chiral intermediates for industrial utilization," Starch/Starke (1990) 42(9):342-349.
Stanek, J. et al., "Monosaccharide dicarboxylic acids," The Monosaccharides, Academic Press, New York and London (1963) Chapter XXXII, p. 741-752.
Styron, S.D. et al., "MM3(96) conformational analysis of D-glucaramide and x-ray crystal structures of three D-glucaric acid derivatives—models for synthetic poly(alkylene D-glucaramides," J. Carb. Chem. (2002) 21(1&2):27-51.
Sukhotin,A.M. et al., "Corrosion inhibitor for steel in calcium chloride solutions," Zashchita Mettalov, Journal in Russion (1982) 18:268-70, Chem Ab 1982:476671.
Van Duin et al., Studies on borate esters. Part 8. Interactions of cations with oxyacid anion-bridged esters of D-glucarate in alkaline media, J. Chem. Soc. Dalton Trans., 1987, 8, 2051-2057.
Van Duin et al., Synergic Coordination of Calcium in Borate-Polyhydroxycarboxylate Systems, Carb. Res., 1987, 162, 65-78.
Werpy, T. et al., Top Value Added Chemicals from Biomass, Voil-Results of Screening for Potential, www.osti.gov/bridge, U.S. Dept. of Energy, Oak Ridge, TN (2004) 76 pages.
Wilham et al., Organic Acids as Builders in Linear Alkylbenzene Sulfonate Detergent Formulations, J. Am. Oil Chem. Soc., 1971, 48(11), 682-683.
Wisconsin Biorefiners Development Initiative and references therein, Biorefining Processes-Fermentation of 6-Carbon Sugars and Starchs, www.wisbiorefine.org/proc/ferments.pdr (Feb. 5, 2007).
Wrubl, C. et al., "Zinc gluconate as an inhibitor of the corrosion of copper and zinc in seawater," 1st Corros. Mar Met, British Corrosion Journal (1983) 18:142-147, Chem. Abstr. AN 1984:11228.
Yahiro et al., "Efficient acid production from raw corn starch," J. Fermentation Bioengineering (1997) 84(4):375-377.
International Preliminary Report on Patentability for Application No. PCT/US2007/017493 dated Feb. 10, 2009.
International Preliminary Report on Patentability for Application No. PCT/US2008/083831 dated May 18, 2010 (8 pages).
International Preliminary Report on Patentability for Application No. PCT/US2011/060264 dated May 23, 2013 (8 pages).
International Search Report and Written Opinion for Application No. PCT/US2012/034538 dated Jul. 10, 2012 (11 pages).
International Search Report and Written Opinion for Application No. PCT/US2012/034542 dated Jul. 10, 2012 (10 pages).
International Search Report for Application No. PCT/US2003/039733 dated May 13, 2004 (2 pages).
International Search Report for Application No. PCT/US2007/017493 dated Feb. 12, 2008.
United States Patent Office Action for U.S. Appl. No. 11/890,760 dated Apr. 16, 2009 (7 pages).
United States Patent Office Action for U.S. Appl. No. 11/890,760 dated Jul. 25, 2008 (8 pages).
United States Patent Office Action for U.S. Appl. No. 12/272,732 dated Apr. 26, 2011.
United States Patent Office Action for U.S. Appl. No. 12/272,732 dated Aug. 24, 2010.
United States Patent Office Action for U.S. Appl. No. 12/272,732 dated Dec. 9, 2011.
United States Patent Office Action for U.S. Appl. No. 12/272,732 dated Jul. 6, 2012 (12 pages).
United States Patent Notice of Allowance for U.S. Appl. No. 12/272,732 dated Aug. 9, 2013 (9 pages).
United States Patent Office Action for U.S. Appl. No. 12/442,135 dated May 16, 2012 (7 pages).
United States Patent Office Action for U.S. Appl. No. 12/442,135 dated Oct. 26, 2011 (7 pages).
United States Patent Office Action for U.S. Appl. No. 12/753,721 dated Dec. 12, 2011 (7 pages).
United States Patent Office Action for U.S. Appl. No. 12/753,721 dated May 9, 2013 (8 pages).
United States Patent Office Notice of Allowance for U.S. Appl. No. 11/890,760 dated Jan. 8, 2010 (6 pages).

(56) References Cited

OTHER PUBLICATIONS

United States Patent Office Notice of Allowance for U.S. Appl. No. 12/753,721 dated Aug. 3, 2012 (5 pages).
United States Patent Office Action for U.S. Appl. No. 13/586,953 dated Jul. 1, 2013 (7 pages).
Van Duin, M., et al., "Studies on borate esters. Part 5. The system glucarate borate calcium (II) as studied by 1H, 11B, and 13C nuclear magnetic resonance spectroscopy," Journal of the Chemical Society, Perkin Transactions 2, No. 4, Jan. 1, 1987, p. 473.
International Search Report from International Patent Application No. PCT/US2011/060264, dated Feb. 10, 2012.
United States Patent Office Action for U.S. Appl. No. 13/452,560 dated Dec. 4, 2013 (11 pages).
United States Patent Office Action for U.S. Appl. No. 13/586,953 dated Jan. 27, 2014 (7 pages).
United States Patent Office Action for U.S. Appl. No. 14/206,796 dated Nov. 4, 2014 (35 pages).
United States Patent Office Action for U.S. Appl. No. 12/422,135 dated Dec. 17, 2014 (8 pages).
Dorwald, F.Z., Side Reactions in Organic Synthesis. A Guide to Succsesful Synthesis Design, Wiley-VCH Verlag GmbH & Co., Weinheim, Germany (2005) Preface.
International Search Report and Written Opinion for Application No. PCT/US2013/071520 dated Feb. 5, 2014 (12 pages).
International Search Report and Written Opinion for Application No. PCT/US2014/024785 dated Jul. 7, 2014 (13 pages).
United States Patent Office Notice of Allowance for U.S. Appl. No. 13/586,953 dated Aug. 7, 2014 (6 pages).
United States Patent Office Action for Application No. 13/452,560 dated Aug. 19, 2014 (10 pages).
United States Patent Office Action for U.S. Appl. No. 13/452,578 dated Sep. 23, 2014 (12 pages).
United States Patent Office Action for U.S. Appl. No. 14/150,633 dated Sep. 25, 2014 (12 pages).
United States Patent Office Action for U.S. Appl. No. 14/089,054 dated Aug. 15, 2014 (16 pages).
United States Patent Office Action for U.S. Appl. No. 14/205,627 dated Aug. 27, 2014 (25 pages).
United States Patent Office Action for U.S. Appl. No. 14/205,832 dated Aug. 27, 2014 (21 pages).
U.S. Appl. No. 14/089,054, filed Nov. 25, 2013, Presta
United States Patent Office Notice of Allowance for U.S. Appl. No. 14/089,054 dated Mar. 2, 2015 (7 pages).
United States Patent Office Action for U.S. Appl. No. 14/107,297 dated Mar. 11, 2015 (4 pages).
Co-Pending U.S. Appl. No. 14/727,712, filed Jun. 1, 2015, Rowley et al.
United States Patent Office Action for U.S. Appl. No. 13/452,560 dated Jun. 18, 2015 (10 pages).
United States Patent Office Action for U.S. Appl. No. 13/452,578 dated Jul. 16, 2015 (16 pages).
United States Patent Office Notice of Allowance for U.S. Appl. No. 14/150,633 dated Jun. 8, 2015 (9 pages).
United States Patent Office Action for U.S. Appl. No. 14/107,297 dated Jun. 19, 2015 (8 apges).
United States Patent Office Action for U.S. Appl. No. 14/205,627 dated May 15, 2015 (28 pages).
United States Patent Office Action for U.S. Appl. No. 14/205,832 dated May 12, 2015 (27 pages).
United States Patent Office Notice of Allowance for U.S. Appl. No. 14/206,796 dated Jul. 17, 2015 (8 pages).
United States Patent Office Action for U.S. Appl. No. 14/727,712 dated Jun. 26, 2015 (14 pages).
United States Patent Office U.S. Appl. No. 14/849,991 by Donald Kiely, filed Sep. 10, 2015.
United States Patent Office U.S. Appl. No. 14/876,148 by Tyler Smith, filed Oct. 6, 2015.
U.S. Appl. No. 14/887,635, filed Oct. 20, 2015, Steven Donen.
United States Patent Notice of Allowance for U.S. Appl. No. 14/107,297 dated Dec. 16, 2015.
International Search Report and Written Opinion for Application No. PCT/US2015/054218 dated Jan. 14, 2016 (13 pages).
United States Patent Office Action for U.S. Appl. No. 14/579,938 dated Jan. 20, 2016 (5 pages).
United States Patent Office Notice of Allowance for U.S. Appl. No. 14/205,627 dated Jan. 21, 2016 (10 pages).
United States Patent Office Action for U.S. Appl. No. 14/205,832 dated Dec. 31, 2015 (18 pages).
United States Patent Office Notice of Allowance for U.S. Appl. No. 13/452,560 dated Jan. 20, 2016 (10 pages).
United States Patent Office Action for U.S. Appl. No. 14/849,991 dated Feb. 11, 2016 (7 pages).
United States Patent Office Notice of Allowance for U.S. Appl. No. 14/727,712 dated Feb. 19, 2016 (9 pages).

* cited by examiner

CORROSION INHIBITING COMPOSITION

RELATED APPLICATION INFORMATION

This application claims priority to U.S. Provisional Application No. 61/412,706 filed on Nov. 11, 2010, the contents of which are herein incorporated by reference.

FIELD OF THE INVENTION

This invention describes novel corrosion inhibitors which are capable of sequestering metal ions such as calcium and magnesium and are derived in part from renewable carbohydrate feedstocks. The corrosion inhibitors are mixtures containing one or more hydroxycarboxylic acid salts and one or more suitable oxoacid anion salts. The hydroxycarboxylic acid salts can be readily produced from carbohydrate and other polyol feedstocks through chemical or biological oxidation.

BACKGROUND OF THE INVENTION

Hydroxycarboxylic acids and hydroxycarboxylic acid salts are well recognized as corrosion inhibitors particularly effective in inhibiting metal corrosion when the metal is in contact with water or an aqueous solution. U.S. Pat. No. 2,529,178 to Nieland et al. taught that these hydroxycarboxylic acids, or salts thereof, may contain a single carboxylic acid function, as in the case of gluconic acid (U.S. Pat. No. 2,529,178), or more than one carboxylic acid functions as in the case of tartaric acid, a hydroxydicarboxylic acid, or citric acid, a hydroxy tricarboxylic acid (U.S. Pat. No. 2,529,177). Nieland et al. also taught that hydroxycarboxylic acids, or salts thereof, with more than one carboxylic acid functions, such as tartaric acid (U.S. Pat. No. 2,529,177), generally exhibit better corrosion inhibition properties than do comparable hydroxymonocarboxylic acids, such as gluconic acid (U.S. Pat. No. 2,529,178).

Hydroxycarboxylic acids have also been shown to inhibit metal corrosion in aqueous salt brine such as sea water (Mor, 1971; Mor, 1976; and Wrubl, 1984) or formulated brine solutions (Kuczynski, 1979; Korzh, 1981; Sukhotin, 1982; and Abdallah, 1999), and some are employed for specific applications, such as in industrial cooling systems (Sukhotin, 1982).

In addition, hydroxycarboxylic acids and hydroxycarboxylic acid salts have been described as chelating agents capable of sequestering metal ions in solution (Mehltretter, 1953; Abbadi, 1999). Hydroxycarboxylic acid salts as sequestering agents for metal ions such as calcium and magnesium, in general perform poorly compared to common sequestering agents such as sodium tripolyphosphate (STPP), ethylenediaminetriacetate (EDTA), or nitrilotriacetate (NTA). In spite of low sequestering capacity, hydroxycarboxylic acid salts are of interest because they are typically biodegradable, non-toxic, and derived from renewable resources such as carbohydrates. Therefore, the use hydroxycarboxylic acid salts as replacement sequestering agents for STPP and EDTA is advantageous, especially in applications where the compounds may be discharged into the environment.

Many chemical compounds that have traditionally been used as corrosion inhibitors and metal sequestering agents are phosphorus based. Through environmental regulations, the use of phosphorus compounds in applications where the material is discharged into surface water continues to be restricted. These regulations have created a need for environmentally acceptable materials for use as corrosion inhibiting agents for a variety of applications. One area of specific need centers around corrosion inhibiting agents which are also capable of sequestering metal ions, specifically metal ions like calcium and magnesium commonly found in tap water or fresh ground water and which can lead to scale formation. In particular, agents capable of both preventing corrosion and inhibiting scale would be useful as builders in detergents or as additives to process water used in industrial cooling towers and boiler systems.

One application in which corrosion inhibitors which act as sequestering agents are useful is in detergent formulations. Detergents are cleaning mixtures composed primarily of surfactants, builders, bleaching-agents, enzymes, and fillers. Two of the major components are surfactants and builders. The surfactants are responsible for emulsification of oil and grease while builders are added to extend or improve the cleaning properties of the surfactant. The builder can be a single substance or a mixture of substances and commonly serve multiple functions. An important builder function is the sequestration of metal cations, typically calcium and magnesium cations in hard water. The builders act as water softening agents by sequestering calcium and magnesium cations and preventing the formation of water insoluble salts between the metals and surfactants (soap scum). In the case of laundry detergents, builders also help prevent the cations from binding to cotton, a major cause of soil retention on cotton fabrics. Other functions of builders include increasing alkalinity of detergent solutions, deflocculating surfactant micelles, and inhibiting corrosion.

The first builders used in commercial detergents were phosphate salts and phosphate salt derivatives. Sodium tripolyphosphate (STPP) was, at one time, the most common builder in both consumer and industrial detergents. Phosphate builders are also touted as corrosion inhibitors for the metal surfaces of washing machines and dishwashers. Phosphates have been gradually phased out of detergents over the past 40 years primarily due to environmental concerns regarding discharge of phosphate rich waste water into surface waters giving rise to eutrophication and ultimately hypoxia (Lowe, 1978). High performance replacements for phosphates in detergents are still sought after.

A second application area for corrosion inhibitors which serve as sequestering agents is in the treatment of process water used in industrial and institutional cooling tower and boiler systems. Two of the primary problems associated with cooling tower and boiler systems are corrosion and build-up of hard water scale on metal surfaces. Corrosion shortens the life of the system equipment while scaling decreases the efficiency of heat flow across the metal surfaces. Historically, phosphates and phosphonates have been used in water treatment as corrosion and scale inhibitors. As with phosphate detergent builders, there is a desire to replace phosphorus-based chemicals used in water treatment. Accordingly, a need exists to have a corrosion inhibitor which also serves as a sequestering agent, and which does not incorporate phosphates or chemicals that have been deemed harmful to the environment.

SUMMARY OF THE INVENTION

The present invention provides a corrosion inhibiting composition for metal comprising a mixture of at least one salt of a hydroxycarboxylic acid and at least one salt of a suitable oxoacid anion. The at least one salt of a hydroxycarboxylic acid is generally a salt of glucaric acid, a salt of xylaric acid, a salt of galactaric acid or combinations thereof. Specifically, the at least one salt of a glucaric acid may include disodium glucarate, sodium potassium glucarate, dipotassium glucarate, zinc glucarate or combinations thereof. In addition, the composition may comprise from about 50% to about 99% by weight of the at least one salt of a hydroxycarboxylic acid and from about 1% to about 50% by weight of at least one salt of an oxoacid anion. The composition may also include from about 70% to about 90% by weight of the at least one salt of a hydroxycarboxylic acid and from about 10% to about 30% by weight of at least one salt of an oxoacid anion. The composition may additionally include from about 75% to about 85% by weight of the at least one salt of a hydroxycarboxylic acid and from about 15% to about 25% by weight of at least one salt of a suitable oxoacid anion.

The at least one salt of a hydroxycarboxylic acid may include combinations of two or more carboxylate salt components. One of the carboxylate salt components may include glucarates, such as, disodium glucarate, sodium potassium glucarate, dipotassium glucarate, diammonium glucarate, and zinc glucarate. The glucarate salt component may include from about 30% to about 70% by weight of the entire composition. Further, the glucarate salt component may include from about 40% to about 60% by weight of the entire composition.

Additionally, one of the carboxylate salt components of the at least one salt of a hydroxycarboxylic acid may include xylarates, such as sodium xylarate, disodium xylarate, sodium potassium xylarate, dipotassium xylarate, diammonium xylarate, and zinc xylarate. The xylarate salt component may include from about 30% to about 70% by weight of the entire composition. Further, the xylarate salt component may include from about 40% to about 60% by weight of the entire composition.

Further, one of the carboxylate salt components of the at least one salt of a hydroxycarboxylic acid may include galactarates, such as sodium galactarate, disodium galactarate, sodium potassium galactarate, dipotassium galactarate, diammonium galactarate, and zinc galactarate. The galactarate salt component may include from about 30% to about 70% by weight of the entire composition. Further, the galactarate component may include from about 40% to about 60% by weight of the entire composition.

With respect to the at least one salt of a hydroxycarboxylic acid, the composition can comprises about 30% to about 75% by weight of the at least one glucarate salt, about 0% to about 20% by weight of the at least one gluconate salt, about 0% to about 10% by weight of the at least one 5-keto-gluconate salt, about 0% to about 10% by weight of the at least one tartrate salt, about 0% to 10% by weight of the at least one tartronate salt, and about 0% to 10% by weight of the at least one glycolate salt. Alternatively, the composition can comprise about 40% to about 60% by weight of the at least one glucarate salt, about 5% to about 15% by weight of the at least one gluconate salt, about 3% to about 9% by weight of the at least one 5-keto-gluconate salt, about 5% to about 10% by weight of the at least one tartrate salt about 5% to 10% by weight of the at least one tartronate salt, and about 1% to 5% by weight of the at least one glycolate salt. In still yet another alternative, the composition can comprise about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt. In still yet another alternative, the composition can comprise about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

In an alternative embodiment, the current invention comprises a corrosion inhibiting composition for metal comprising a mixture of from about 75% to about 85% by weight of at least one salt of a hydroxycarboxylic acid and from about 15% to about 25% of at least one salt of a suitable oxoacid anion. The at least one salt of a hydroxycarboxylic acid may include from about 40% to about 60% by weight of a salt of glucaric acid. Additionally, the salt of glucaric acid may include, disodium glucarate, sodium potassium glucarate, dipotassium glucarate, diammonium glucarate, zinc glucarate, and combinations thereof.

Moreover, the at least one salt of a hydroxycarboxylic acid may alternatively include from about 30% to about 70% by weight of a salt of xylaric acid. The salt of xylaric acid may include, disodium xylarate, sodium potassium xylarate, dipotassium xylarate, diammonium xylarate, zinc xylarate, and combinations thereof.

Further, the at least one salt of a hydroxycarboxylic acid may include from about 30% to about 70% by weight of a salt of galactaric acid. The salt of galactaric acid may include, disodium glucarate, sodium potassium glucarate, dipotassium glucarate, zinc glucarate, diammonium galactarate, and combinations thereof.

In addition, the at least one salt of a hydroxycarboxylic acid used in the composition can comprise a mixture of about 30% to about 75% by weight of the at least one glucarate salt, about 0% to about 20% by weight of the at least one gluconate salt, about 0% to about 10% by weight of the at least one 5-keto-gluconate salt, about 0% to about 10% by weight of the at least one tartrate salt, about 0% to 10% by weight of the at least one tartronate salt, and about 0% to 10% by weight of the at least one glycolate salt. Alternatively, the at least one salt of a hydroxycarboxylic acid used in the composition can comprise a mixture of about 40% to about 60% by weight of the at least one glucarate salt, about 5% to about 15% by weight of the at least one gluconate salt, about 3% to about 9% by weight of the at least one 5-keto-gluconate salt, about 5% to about 10% by weight of the at least one tartrate salt about 5% to 10% by weight of the at least one tartronate salt, and about 1% to 5% by weight of the at least one glycolate salt. In still yet another alternative, the at least one salt of a hydroxycarboxylic acid used in the composition can comprise a mixture of about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt. In still yet another alternative, the at least one salt of a hydroxycarboxylic acid can comprise a mixture of about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

Suitable salts of oxoacid anions include sodium and potassium salts of borate, aluminate, stannate, germanate, molybdate, antimonate and combinations thereof.

DETAILED DESCRIPTION OF THE INVENTION

This invention describes novel corrosion inhibitors comprising mixtures of hydroxycarboxylic acid salts and suitable salts of oxoacid anions. Hydroxycarboxylic acids are compounds which contain one or more hydroxyl groups as well as one or more carboxylic acid functionalities. The hydroxyl groups of these compounds are capable of forming esters when combined with suitable salts of oxoacid anions in water. In addition, these oxoacid anion esters of hydroxycarboxylic acids have been shown to form stable, water soluble complexes with metal ions such as calcium and magnesium, as opposed to hydroxycarboxylic acids alone which typically form water insoluble salts with many metal ions. Thus, the combination of corrosion inhibiting properties and metal sequestering properties of the current invention make mixtures of oxoacid anion salts and hydroxycarboxylic acid salts attractive for use as scale inhibitors and detergent builders.

As used herein, the term "hydroxycarboxylic acid" can generally be considered any oxidation derivative of carbohydrates or other polyols. The term polyol is generally defined as any organic compound with two or more alcohol hydroxyl groups. Suitable carbohydrates or polyols for oxidation include: simple aldoses and ketoses such as glucose, xylose or fructose; simple polyols such as glycerol, sorbitol or mannitol; reducing disaccharides such as maltose, lactose, or cellobiose; reducing oligosaccharides such as maltotriose, maltotetrose, or maltotetralose; nonreducing carbohydrates such as sucrose, trehalose and stachyose; mixtures of monosaccharides and oligosaccharides (that may include disaccharides); glucose syrups with different dextrose equivalent values; polysaccharides such as, but not limited to, starch, cellulose, arabinogalactans, xylans, mannans, fructans, hemicelluloses; mixtures of carbohydrates and other polyols that include one or more of the carbohydrates or polyols listed above. One skilled in the art will appreciate that compounds with two or more carboxylic acid groups tend to perform better as corrosion inhibitors than those containing only one carboxylic acid group. Specific examples of hydroxycarboxylic acids that may be used in the current invention include, but are not limited to glucaric acid, xylaric acid, galactaric acid, gluconic acid, tartaric acid, tartronic acid, glycolic acid, glyceric acid, and combinations thereof. In one embodiment, the hydroxycarboxylic acid includes glucaric acid, xylaric acid, and galactaric acid. Additionally, one skilled in the art will appreciate that the hydroxycarboxylic acids of the current invention encompasses all conceivable stereoisomers, including diastereomers and enantiomers, in substantially pure form as well as in any mixing ratio, including the racemates of the hydroxycarboxylic acids.

In general, the compositions of the current invention comprise from about 1% to about 99% by weight of the at least one salt of a hydroxycarboxylic acid and from about 1% to about 99% by weight of at least one salt of a suitable oxoacid anion. In one embodiment, the composition includes from about 50% to about 99% by weight of the at least one salt of a hydroxycarboxylic acid and from about 1% to about 99% by weight of the at least one salt of an oxoacid anion. In a further embodiment, the composition includes from about 60% to about 95% by weight of the at least one salt of a hydroxycarboxylic acid and from about 5% to about 40% by weight of the at least one salt of an oxoacid anion. In still another embodiment, the composition includes from about 70% to about 90% by weight of the at least one salt of a hydroxycarboxylic acid and from about 10% to about 30% by weight of the at least one salt of an oxoacid anion. In an additional embodiment, the composition includes from about 75% to about 85% by weight of the at least one salt of a hydroxycarboxylic acid and from about 15% to about 25% by weight of the at least one salt of an oxoacid anion. In yet another embodiment, the composition comprises about 80% by weight of the at least one salt of a hydroxycarboxylic acid and about 20% by weight of the at least one salt of an oxoacid anion. It should be noted that the concentrations stated herein refer to the cumulative concentration of all carboxylate salts comprising the at least one salt of a hydroxycarboxylic acid component, and that a single carboxylate salt (wherein the hydroxycarboxylate salt component comprises two or more carboxylate salts) may comprise less than the stated concentration.

The corrosion inhibiting compositions of the current invention comprise the salt form of the hydroxycarboxylic acids discussed herein. One of skill in the art will appreciate that salts are generally the compounds that arise from the neutralization reaction of an acid and a base. Any oxidation derivative of a carbohydrate or other polyol may be incorporated in its salt form into the current invention. Non-limiting examples of hydroxycarboxylic acid salts include disodium glucarate, sodium potassium glucarate, dipotassium glucarate, dilithium glucarate, lithium sodium glucarate, lithium potassium glucarate, zinc glucarate, diammonium glucarate, disodium xylarate, sodium potassium xylarate, dipotassium xylarate, dilithium xylarate, lithium sodium xylarate, lithium potassium xylarate, zinc xylarate, ammonium xylarate sodium gluconate, potassium gluconate, lithium gluconate, zinc gluconate, ammonium gluconate, disodium galactarate, sodium potassium galactarate, dipotassium galactarate, dilithium galactarate, lithium sodium galactarate, lithium potassium galactarate, zinc galactarate, diammonium galactarate, disodium tartrate, sodium potassium tartrate, dipotassium tartrate, dilithium tartrate, lithium sodium tartrate, lithium potassium tartrate, zinc tartrate, diammonium tartrate, disodium tartronate, sodium potassium tartronate, dipotassium tartronate, dilithium tartronate, lithium sodium tartronate, lithium potassium tartronate, zinc tartronate, diammonium tartronate, sodium glycolate, potassium glycolate, lithium glycolate, zinc glycolate, ammonium glycolate, sodium glycerate, potassium glycerate, lithium glycerate, zinc glycerate, ammonium glycerate, and combinations thereof. In another embodiment, the hydroxycarboxylic acid may include, but is not limited to, disodium glucarate, sodium potassium glucarate, dipotassium glucarate, zinc glucarate, disodium xylarate, sodium potassium xylarate, dipotassium xylarate, zinc xylarate, disodium galactarate, sodium potassium galactarate, dipotassium galactarate, zinc galactarate, diammonium xylarate, and combinations thereof.

In one aspect, with respect to the at least one salt of a hydroxycarboxylic acid, the corrosion inhibiting compositions of the present invention comprise about 30% to about 75% by weight of the at least one glucarate salt, about 0% to about 20% by weight of the at least one gluconate salt, about 0% to about 10% by weight of the at least one 5-keto-gluconate salt, about 0% to about 10% by weight of the at least one tartrate salt, about 0% to 10% by weight of the at least one tartronate salt, and about 0% to 10% by weight of the at least one glycolate salt. Alternatively, the composition comprises about 40% to about 60% by weight of the at least one glucarate salt, about 5% to about 15% by weight of the at least one gluconate salt, about 3% to about 9% by weight of the at least one 5-keto-gluconate salt, about 5% to about 10% by weight of the at least one tartrate salt about 5% to 10% by weight of the at least one tartronate salt, and about 1% to 5% by weight of the at least one glycolate salt. In still yet another alternative, the composition comprises about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt. In still yet another alternative, the composition comprises about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

In another aspect, the at least one salt of a hydroxycarboxylic acid in the corrosion inhibiting composition comprises a mixture of about 30% to about 75% by weight of the at least one glucarate salt, about 0% to about 20% by weight of the at least one gluconate salt, about 0% to about 10% by weight of the at least one 5-keto-gluconate salt, about 0% to about 10% by weight of the at least one tartrate salt, about 0% to 10% by weight of the at least one tartronate salt, and about 0% to 10% by weight of the at least one glycolate salt. Alternatively, the at least one salt of a hydroxycarboxylic acid comprises a mixture of about 40% to about 60% by weight of the at least one glucarate salt, about 5% to about 15% by weight of the at least one gluconate salt, about 3% to about 9% by weight of the at least one 5-keto-gluconate salt, about 5% to about 10% by weight of the at least one tartrate salt about 5% to 10% by weight of the at least one tartronate salt, and about 1% to 5% by weight of the at least one glycolate salt. In still yet another alternative, the at least one salt of a hydroxycarboxylic acid comprises a mixture of about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt. In still yet another alternative, In still yet another alternative, the at least one salt of a hydroxycarboxylic acid comprises a mixture of about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

The hydroxycarboxylic acids of the current invention may be produced according to any methods currently known in the art. The currently employed commercial methods of preparation of the common hydroxycarboxylic acids or salts thereof are principally biologically induced transformations or fermentations, as for example in the production of tartaric acid (U.S. Pat. No. 2,314,831), gluconic acid (U.S. Pat. No. 5,017,485), and citric acid (U.S. Pat. No. 3,652,396). Chemical methods for oxidation also exist, although they are not as prevalent in commercial production. Some chemical oxidation methods suitable for polyol feedstocks include oxidation with oxygen over metal catalysts (U.S. Pat. No. 2,472,168) and oxidation with chlorine or bromine with an aminoxyl radical such as TEMPO (U.S. Pat. No. 6,498,269). Additional methods employ nitric acid as the oxidizing agent in aqueous solution and have been described (Kiely, U.S. Pat. No. 7,692,041). The skilled artisan will appreciate that any of the methods described herein, as well as any combination of the methods may be used to obtain the hydroxycarboxylic acid.

The oxidation of a variety of feedstocks, including glucose will generally produce a mixture of oxidation products that includes gluconic acid, glucaric acid, tartaric acid, tartronic acid, and glycolic acids, all of which are hydroxycarboxylic acids, and within the scope of the current invention. It was surprisingly found that the combination of the salts of the hydroxycarboxylic acids discussed herein with a salt of boric acid provided corrosion inhibition properties similar to the use of the combination of hydroxycarboxylic acid salts alone. The use of hydroxycarboxylic acids as a potential corrosion inhibitor has been previously discussed (see U.S. Published Patent Application 2009/0250653); however, combining the hydroxycarboxylic acid salts with an oxoacid anion, such as borate has not previously been contemplated, due to the fact that oxoacid anions, such as borate, are potentially corrosive to metals, as evidenced by the corrosion tests performed in Example 3 and 4. Specifically, the product mixture of multiple (or a mixture of) hydroxycarboxylic acid salts with borate performed comparable to pure glucarate with borate (see Example 1, Table 1). Even more surprising was that the oxidation product with borate performed comparable to the oxidation product without borate or pure glucarate without borate. These findings were unexpected since borate itself is more corrosive than water and since the overall concentration of the hydroxycarboxylic acid salts is less in the test solution when combined with borate than when tested alone (in both cases the total concentration of the inhibitor in the test solution was 0.09%).

The current invention also provides improved efficiencies due to the fact that a portion of the glucaric acid salt may be removed from the mixture of hydroxycarboxylic acid salts without comprising the efficacy as a corrosion inhibitor. One of skill in the art will appreciate that the ability to remove glucarate will improve the cost-effectiveness of the product, and allow for greater efficiencies in the manufacturing process.

The compositions of the current invention, including the mixtures with multiple hydroxycarboxylic acid salts, were also evaluated as a sequestering agent for calcium (see Example 9, Table 4). As seen with pure glucarate salts, the mixture alone proved to be a poor sequestering agent. However, in conjunction with borate salts, the sequestering ability significantly improved. Accordingly, the compositions of the current invention provide both corrosion inhibition, as well as metal sequestering properties.

The compounds and processes of the invention will be better understood by reference to the following examples, which are intended as an illustration of and not a limitation upon the scope of the invention. Each example illustrates at least one method of preparing various intermediate compounds and further illustrates each intermediate utilized in the overall process. These are certain preferred embodiments, which are not intended to limit the present invention's scope. On the contrary, the present invention covers all alternatives, modifications, and equivalents as can be included within the scope of the claims and routine experimentation.

Example I

Preparation of Corrosion Inhibitor Test Solutions

Corrosion tests were carried out using steel coupons immersed in test solutions as described below. Test solutions were prepared with deionized water. For inhibited test solutions, the corrosion inhibitor was added to give a 0.09% concentration based on dry weight. Solutions containing hydroxycarboxylic acid salt/oxoacid anion salt corrosion inhibitors were prepared at different weight ratios of the appropriate oxoacid anion salt to hydroxycarboxylic acid salt.

Example 2

Corrosion Test Methods

Compounds and compound mixtures were evaluated as corrosion inhibitors in aqueous solutions using a modified version of the National Association of Corrosion Engineers (NACE) Standard TM0169-95 laboratory immersion test. Distilled water was used to prepare each solution and as a control standard. The effectiveness of each corrosion inhibitor mixture was measured in both distilled water and 3% sodium chloride (NaCl) solution. When corrosion inhibition was measured in salt solution, a 3% solution of NaCl in distilled water (300 g) was used as a salt reference. Each test solution was prepared by dissolving the corrosion inhibitor (270 mg) in 300 mL of either distilled water or 3% NaCl solution to give a 0.09% inhibitor solution. The pH of the inhibitor test solutions was then made basic (pH 9-10) by the addition of 5% sodium hydroxide.

Stamped and numbered steel TSI coupons which met the ASTM F436 Type 1 requirement with a Rockwell hardness of C 38-45 were used in the corrosion tests. Average coupon dimensions were 3.50 cm outer diameter, 1.52 cm inner diameter, and 0.25 cm thickness with a density of 7.85 g/cm', Prior to testing, the coupons were placed in a sealed container on a rock tumbler with a non-abrasive cleanser for 30 minutes to remove surface grease and impurities, then wiped with acetone to remove any additional grease, rinsed with deionized water, and acid etched with an 18.5% HCl solution for approximately 3 minutes. The coupons were rinsed with deionized water, patted dry, placed in chloroform for 15 minutes, and then allowed to air dry in a ventilated hood for 1 hour. Each coupon was weighed to the nearest 0.1 mg at least two times to ensure a consistent weight. Three cleaned and weighed coupons were attached to a plastic bar suspended in a stoppered 500 mL Erlenmeyer flask by a thin line through a hole in the stopper. A timed device raised and lowered the test coupons so they were immersed in the test solution for 10 minutes of each hour for a 72 hour period. Tests were conducted at room temperature.

After the 72 hour test period, the coupons were removed from solution, rinsed under tap water, and vigorously rubbed to remove any surface corrosion material. The coupons were then placed in a cleaning solution of concentrated hydrochloric acid containing 5% stannous chloride and 2% antimony chloride. After 15 minutes, the coupons were removed from the acid solution, rinsed vigorously under tap water, and returned to the cleaning solution for an additional 15 minutes. The coupons were again removed from the acid solution, rinsed under tap water, rinsed under deionized water, patted dry, and placed in a vessel containing chloroform for 10 minutes. The coupons were removed from the chloroform and allowed to air dry under a ventilated hood for 1 hour before being weighed to the nearest 0.1 mg. Each coupon was weighed twice, and the weights were averaged. Corrosion rate in mils per year (MPY) was calculated from the measured weight loss of each coupon using the following equation:

$$MPY = \frac{\text{weight loss (mg)} \cdot 534}{\text{area (cm}^2) \cdot \text{time (h)} \cdot \text{metal density}}$$

$$\text{metal density} = 7.85 \text{ g/cm}^3$$

$$\text{time} = 72 \text{ hours}$$

The MPY values of each of three coupons in the test solution were averaged to determine the MPY value of the entire test solution. The average corrosion rate for the control solution of distilled H2O was also calculated and was subtracted from the MPY value of each sample solution to give a corrected MPY value, which is noted as $MPY^1$.

Example 3

Corrosion Inhibition of Mixtures of Hydroxycarboxylic Acid Salts and Oxoacid Anion Salts in Water The effectiveness of mixtures of hydroxycarboxylic acid salts and oxoacid anion salts were tested in distilled water, and the results were compared to hydroxycarboxylic acid salts without oxoacid anion salts (Table 1). Corrosion inhibitor test solutions were prepared with boric acid and monopotassium D-glucarate (MKG), and the pH of the test solutions were made basic with sodium hydroxide. Sodium borate was prepared by neutralizing boric acid with sodium hydroxide to pH 9. In all cases, the total concentration of corrosion inhibitor in the test solution was 0.09%.

TABLE 1

Corrosion Rates (MPY) and Corrected Corrosion Rates ($MPY^1$) of Corrosion Inhibitors in Distilled Water

| Corrosion Inhibitor | MPY | $MPY^1$ |
|---|---|---|
| None ($H_20$ control) | 1.97 | 0.000 |
| 100% Sodium borate | 2.97 | 1.00 |
| 100% Monopotassium D-glucarate (MKG) | 0.98 | −0.99 |
| 80% MKG/20% boric acid | 1.01 | −.096 |
| 50% MKG/50% boric acid | 2.22 | 0.25 |

Sodium borate is not an effective corrosion inhibitor and has a higher MPY corrosion rate than distilled water, thus giving a corrected $MPY^1$ rate greater than zero. Neutralized MKG is an effective corrosion inhibitor with an $MPY^1$ value less than zero. The surprising result was that combinations of glucarate and borate also serve as effective corrosion inhibitors giving negative $MPY^1$ values despite the fact that the amount of glucarate in the mixture is less than 100% and that borate is more corrosive than water. In the case of neutralized 80% MKG and 20% boric acid, the corrosion inhibition effectiveness is comparable to neutralized MKG alone.

Example 4

Corrosion Inhibition of Mixtures of Hydroxycarboxylic Acid Salts and Oxoacid Anion Salts in 3% Sodium Chloride The effectiveness of mixtures of hydroxycarboxylic acid salts and oxoacid anion salts were tested in 3% sodium chloride, and the results were compared to hydroxycarboxylic acid salts without oxoacid anion salts (Table 2). Corrosion inhibitor test solutions were prepared with borax (sodium borate), sodium molybdate, sodium aluminate, or mixtures thereof as the oxoacid anion salt component and with monopotassium D-glucarate (MKG), zinc glucarate, sodium gluconate, xylaric acid, or galactaric acid as the hydroxycarboxylic acid salt component. In each case, the pH of the test solutions were made basic with sodium hydroxide, and the total concentration of corrosion inhibitor in the test solution was 0.09%.

TABLE 2

Corrosion Rates (MPY) and Corrected Corrosion Rates ($MPY^1$) of Corrosion Inhibitors in 3% Sodium Chloride Solution

| Corrosion Inhibitor | MPY | $MPY^1$ |
|---|---|---|
| $H_20$ (control) | 3.28 | 0.000 |
| NaCl (control) | 58.04 | 54.76 |
| 100% Sodium borate | 61.54 | 58.26 |
| 100% Monopotassium D-glucarate (MKG) | 24.87 | 21.59 |
| 80% MKG/20% sodium borate | 28.99 | 25.71 |
| 80% Zinc glucarate/20% borate | 14.67 | 11.39 |
| 80% MKG/20% sodium molybdate | 24.96 | 21.68 |
| 50% MKG/50% sodium molybdate | 30.75 | 27.47 |
| 64% MKG/16% sodium molybdate/ 20% sodium borate | 25.00 | 21.72 |
| 100% Sodium aluminate | 30.56 | 27.28 |
| 67% MKG/33% sodium aluminate | 29.29 | 26.01 |
| 100% Sodium gluconate | 29.56 | 26.28 |
| 80% Sodium gluconate/20% sodium borate | 31.82 | 28.54 |
| 100% Xylaric acid | 32.33 | 29.05 |
| 80% Xylaric acid/20% sodium borate | 34.06 | 30.78 |
| 100% Galactaric acid | 25.92 | 22.64 |
| 80% Galactaric acid/20% sodium borate | 28.27 | 24.99 |

As seen in Table 2, sodium borate is not an effective corrosion inhibitor in sodium chloride and is actually more corrosive than 3% sodium chloride alone. The mixtures of sodium borate and various hydroxycarboxylic acid salts all show slightly higher but comparable corrosion rates as compared to the hydroxycarboxylic acid salts alone. Again, the surprising result was that the mixtures of hydroxycarboxylic acid salts and borate also serve as effective corrosion inhibitors despite the fact that the mixture contains less hydroxycarboxylic acid salt and that borate is a corrosive agent. The mixtures of hydroxycarboxylic acid salts and borate have the added benefit of providing much higher calcium sequestering properties compared to the hydroxycarboxylic acid salts alone (Table 4). The results of Table 2 also illustrate the use of zinc glucarate in combination with sodium borate as a corrosion inhibitor. Zinc salts are known corrosion inhibitors; however, the use of zinc glucarate is limited due to its low water solubility. The addition of borate increases the water solubility of zinc glucarate and therefore improves the corrosion inhibiting properties of the mixture.

Sodium aluminate alone is a corrosion inhibitor and mixtures with glucarate also show corrosion inhibiting properties. The mixtures, however, have the added advantage of high performance as calcium sequestering agents compared to either glucarate or aluminate alone (Table 4).

Example 5

Preparation of Glucarate Mixture 1

Glucarate mixture 1 was prepared by the nitric acid oxidation of glucose as described in U.S. Pat. No. 7,692,041. After removal of nitric acid from the oxidation mixture, the organic acid products were neutralized with sodium hydroxide to give glucarate mixture 1. The amounts of the sodium salts of glucaric acid, gluconic acid, and tartaric acid in glucarate mixture 1 are given in Table 3.

Example 6

Preparation of Glucarate Mixture 2

Dextrose was oxidized and nitric acid was separated as described in U.S. Pat. No. 7,692,041. The resulting oxidation product mixture was neutralized to a pH of 3.5 with aqueous potassium hydroxide which produced a precipitate. The solid precipitate was isolated by filtration, and the filtrate was neutralized with aqueous sodium hydroxide to a pH of 9 to give Glucarate mixture 2. The amounts of the sodium salts of glucaric acid, gluconic acid, and tartaric acid in glucarate mixture 2 are given in Table 3.

Example 7

Preparation of Glucarate Mixture 3

Sodium gluconate (0.27 g) was added to glucarate mixture 2 (10.1 g, 20% w/w) to give glucarate mixture 3. The amounts of the sodium salts of glucaric acid, gluconic acid, and tartaric acid in glucarate mixture 3 are given in Table 3.

Example 8

Corrosion Inhibition of Mixtures of Multiple Hydroxycarboxylic Acid Salts and an Oxoacid Anion Salt The effectiveness of mixtures of multiple hydroxycarboxylic acid salts and oxoacid anion salts were tested in distilled water and in 3% sodium chloride and the results were compared to mixtures of multiple hydroxycarboxylic acid salts without an oxoacid anion salt (Table 3). Corrosion inhibitor test solutions were prepared with either borax (sodium borate) or sodium aluminate, as the oxoacid anion salt component and with glucarate mixtures 1-4 (see Example 5-7) as the hydroxycarboxylic acid salt component. In each case, the test solution was made basic with sodium hydroxide, and the total concentration of corrosion inhibitor in the test solution was 0.09%.

TABLE 3

Corrosion Inhibition of Mixtures of Multiple Hydroxycarboxylic Acid Salts and Borate

| Sample | % Glucarate Salt | % Gluconate Salt | % Tartrate Salt | % Oxoacid Anion Salt | MPY |
|---|---|---|---|---|---|
| $H_20$ | 0 | 0 | 0 | 0 | 3.28 |
| Glucarate Mixture 1 | 60 | 25 | 5 | 0 | 1.13 [a] |
| Glucarate Mixture 1/ sodium borate | 48 | 20 | 4 | 20 | 0.45 [a] |
| Glucarate Mixture 1/ sodium borate | 42 | 18 | 3.5 | 30 | 0.67 [a] |
| Glucarate Mixture 1 | 60 | 25 | 5 | 0 | 24.10 [b] |
| Glucarate Mixture 1/ sodium borate | 48 | 20 | 4 | 20 | 29.31 [b] |
| Glucarate Mixture 1/ sodium aluminate | 42 | 18 | 3.5 | 30 | 31.32 [b] |
| Glucarate Mixture 2 | 50 | 30 | 6 | 0 | 27.06 [b] |
| Glucarate Mixture 2/ sodium borate | 40 | 24 | 5 | 20 | 32.50 [b] |
| Glucarate Mixture 3/ sodium borate | 20 | 62 | 2 | 10 | 30.53 [b] |
| 3% NaCl | 0 | 0 | 0 | 0 | 58.04 |

[a] Corrosion rate measured in distilled water.
[b] Corrosion rate measured in 3% sodium chloride solution.

The results in Table 3 demonstrate the efficacy of mixtures of hydroxycarboxylic acid salts including glucarate, gluconate, and tartrate as corrosion inhibitors. These results also demonstrate the synergistic relationship between glucarate, gluconate, and tartrate with borate in solution. In general, mixtures with higher levels of glucarate perform better than those with less glucarate; however, glucarate mixture 1 showed improved corrosion inhibition in sodium chloride solution compared to the solution of pure glucarate (Table 2). Further, the corrosion results for all solutions were similar to those obtained by the pure glucarate solution, suggesting that the replacement of some of the glucarate with other hydroxycarboxylates such as gluconate and tartrate provides a useful alternative to corrosion inhibiting solutions containing pure glucarate. Even the solutions incorporating borate showed similar efficacy for corrosion inhibition, which was surprising given the fact that borate is known to be corrosive and that the level of glucarate was reduced in these mixtures.

Example 9

Calcium Sequestration Capacity

The calcium chelating ability of various compounds and mixtures was determined by an established procedure (Wilham, 1971). Briefly, the sequestering agent (1.0 g dry weight) was dissolved in deionized water and diluted to 50 mL. The pH of the solution was adjusted to 10 with 45% aqueous sodium hydroxide, followed by the addition of 2% aqueous sodium oxalate (2 mL). The test solution was titrated to slight turbidity with 1% aqueous calcium acetate. Each mL of 1% calcium acetate is equivalent to 6.32 mg of $CaCO_3$. Results from the sequestration tests are given in Table 4. It is evident from the results in Table 4 that hydroxycarboxylic acid salts alone are poor sequestering agents for calcium given the low values for mg $CaCO_3$ per g of sequestering agent; however through the addition of suitable oxoacid anion salts such as sodium borate, the sequestering capacity is greatly improved.

TABLE 4

Calcium Sequestration of Various Compounds and Compound Mixtures at pH 10 and 25° C.

| Sequestering Agent | mg $CaCO_3$/ g of compound |
|---|---|
| 100% Sodium potassium D-glucarate (SPG) | 25.6 |
| 100% Glucarate mixture 1 | 24.6 |
| 100% Glucarate mixture 2 | 38.9 |
| 100% Sodium borate | 12.3 |
| 90% SPG/10% sodium borate | 158 |
| 80% SPG/20% sodium borate | 219 |
| 60% SPG/40% sodium borate | 190 |
| 20% SPG/80% sodium borate | 64.5 |
| 80% SPG/20% sodium aluminate | 303 [a] |
| 70% SPG/30% sodium aluminate | 315 [a] |
| 90% Glucarate mixture 1/10% sodium borate | 114 |
| 85% Glucarate mixture 1/15% sodium borate | 145 |
| 80% Glucarate mixture 1/20% sodium borate | 150 |
| 75% Glucarate mixture 1/25% sodium borate | 138 |
| 70% Glucarate mixture 1/30% sodium borate | 139 |
| 60% Glucarate mixture 1/40% sodium borate | 129 |
| 20% Glucarate mixture 1/80% sodium borate | 63.2 |
| 70% Glucarate mixture 1/30% sodium aluminate | 235 [a] |
| 80% Glucarate mixture 2/20% sodium borate | 140 |
| 60% Glucarate mixture 2/40% sodium borate | 121 |
| 20% Glucarate mixture 2/80% sodium borate | 62.4 |

[a] Calcium sequestration measured at pH 11

What is claimed is:

1. A corrosion inhibiting composition for metal comprising a mixture of at least one salt of a hydroxycarboxylic acid and at least one salt of an oxoacid anion, wherein the at least one salt of a hydroxycarboxylic acid comprises about 40% to about 60% by weight of at least one glucarate salt, about 5% to about 15% by weight of at least one gluconate salt, about 3% to about 9% by weight of at least one 5-keto-gluconate salt, about 5% to about 10% by weight of at least one tartrate salt, about 5% to 10% by weight of at least one tartronate salt, and about 1% to 5% by weight of at least one glycolate salt.

2. The corrosion inhibiting composition of claim 1, wherein the at least one salt of a hydroxycarboxylic acid comprises about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt.

3. The corrosion inhibition composition of claim 1, wherein the at least one salt of a hydroxycarboxylic acid comprises about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

4. The corrosion inhibiting composition of claim 1, wherein the at least one salt of a hydroxycarboxylic acid comprises a salt of glucaric acid, a salt of xylaric acid, a salt of galactaric acid, or combinations thereof.

5. The corrosion inhibiting composition of claim 4, wherein the at least one salt of a hydroxycarboxylic acid comprises about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt.

6. The corrosion inhibition composition of claim 4, wherein the at least one salt of a hydroxycarboxylic acid comprises about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

7. A corrosion inhibiting composition for metal comprising a mixture of from about 75% to about 85% by weight of at least one salt of a hydroxycarboxylic acid and from about 15% to about 25% by weight of at least one salt of an oxoacid anion, wherein the at least one salt of a hydroxycarboxylic acid comprises about 40% to about 60% by weight of at least one glucarate salt, about 5% to about 15% by weight of at least one gluconate salt, about 3% to about 9% by weight of at least one 5-keto-gluconate salt, about 5% to about 10% by weight of at least one tartrate salt, about 5% to 10% by weight of at least one tartronate salt, and about 1% to 5% by weight of at least one glycolate salt.

8. The corrosion inhibiting composition of claim 7, wherein the at least one salt of a hydroxycarboxylic acid comprises about 45% to about 55% by weight of the at least one glucarate salt, about 10% to about 15% by weight of the at least one gluconate salt, about 4% to about 6% by weight of the at least one 5-keto-gluconate salt, about 5% to about 7% by weight of the at least one tartrate salt, about 5% to 7% by weight of the at least one tartronate salt, and about 3% to 5% by weight of the at least one glycolate salt.

9. The corrosion inhibition composition of claim 7, wherein the at least one salt of a hydroxycarboxylic acid comprises about 50% by weight of the at least one glucarate salt, about 15% by weight of the at least one gluconate salt, about 4% by weight of the at least one 5-keto-gluconate salt, about 6% by weight of the at least one tartrate salt, about 6% by weight of the at least one tartronate salt, and about 5% by weight of the at least one glycolate salt.

* * * * *